(12) United States Patent
Fujita et al.

(10) Patent No.: US 10,337,559 B2
(45) Date of Patent: Jul. 2, 2019

(54) BALL BEARING AND METHODS OF PRODUCTION OF BALL BEARING

(71) Applicant: NIPPON STEEL & SUMITOMO METAL CORPORATION, Tokyo (JP)

(72) Inventors: Takashi Fujita, Tokyo (JP); Yutaka Neishi, Tokyo (JP); Hiroki Narumiya, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 6 days.

(21) Appl. No.: 15/549,847

(22) PCT Filed: Mar. 2, 2016

(86) PCT No.: PCT/JP2016/056470
§ 371 (c)(1),
(2) Date: Aug. 9, 2017

(87) PCT Pub. No.: WO2016/140279
PCT Pub. Date: Sep. 9, 2016

(65) Prior Publication Data
US 2018/0031040 A1    Feb. 1, 2018

(30) Foreign Application Priority Data

Mar. 3, 2015 (JP) .................................. 2015-041794
Jul. 15, 2015 (JP) .................................. 2015-141364

(51) Int. Cl.
*F16C 33/58* (2006.01)
*F16C 19/06* (2006.01)
(Continued)

(52) U.S. Cl.
CPC ............ *F16C 33/585* (2013.01); *F16C 19/06* (2013.01); *F16C 19/10* (2013.01); *F16C 33/64* (2013.01);
(Continued)

(58) Field of Classification Search
CPC ................................ F16C 33/585; F16C 19/06
See application file for complete search history.

(56) References Cited

U.S. PATENT DOCUMENTS 1,587,184 A * 6/1926 Riebe ...................... F16C 33/60
384/516
2,142,474 A * 1/1939 Langhaar .............. F16C 33/585
29/898.063
(Continued)

FOREIGN PATENT DOCUMENTS

CA         2996225 A1 *  3/2017 ............. A61C 1/181
DE    102010013741 A1    6/2011
(Continued)

OTHER PUBLICATIONS

Machine translation of JP2002005178.*
(Continued)

*Primary Examiner* — Thomas R Hannon
(74) *Attorney, Agent, or Firm* — Birch, Stewart, Kolasch & Birch, LLP

(57) ABSTRACT

A ball bearing not allowing locations where the surface pressure becomes locally higher at a race at the time of a high load and thereby keeping cracking from occurring and in turn realizing a longer lifespan is provided. A pair of races (12, 14) and at least one rolling element (16) movably clamped between the pair of races move are provided. A cross-sectional profile line (14a) of a part of each of the pair of races contacting the rolling element has the smallest radius of curvature at a position (P) sticking out the most in the first direction (D1) over which the pair of races face. The cross-sectional profile line becomes larger in radius of curvature the further from the position (P) in a second direction (D2) vertical to the first direction (D1) in the cross-section. The cross-sectional profile line is comprised of a single function. When a midpoint of the profile line in
(Continued)

the second direction is the origin, an axis extending in the second direction is the X-axis and the axis extending in the first direction is the Y-axis, and a radius of the rolling element is (R), the cross-sectional profile line satisfies equation (1):

$$X^2/\{2R(1+0.05)\} < Y < X^2/\{2R(1-0.05)\} \tag{1}$$

5 Claims, 14 Drawing Sheets

(51) Int. Cl.
    *F16C 19/10*         (2006.01)
    *F16C 33/64*         (2006.01)

(52) U.S. Cl.
    CPC ...... *F16C 2220/46* (2013.01); *F16C 2220/60* (2013.01); *F16C 2223/10* (2013.01); *F16C 2240/50* (2013.01); *F16C 2240/70* (2013.01)

(56) References Cited

U.S. PATENT DOCUMENTS

| | | | | |
|---|---|---|---|---|
| 2,142,478 A * | 1/1939 | Murden | ............... | F16C 33/585 384/516 |
| 4,334,721 A * | 6/1982 | Satoh | ................... | F16C 33/585 384/450 |
| 4,343,521 A * | 8/1982 | Akabane | ............... | F16C 33/585 384/450 |
| 4,565,457 A * | 1/1986 | Flander | ................. | F16C 33/585 384/450 |
| 6,010,420 A | 1/2000 | Niki et al. | | |
| 6,620,262 B1 | 9/2003 | Okita et al. | | |
| 6,817,770 B2 * | 11/2004 | Ishiguro | .................. | F16C 19/06 384/450 |
| 7,618,193 B2 * | 11/2009 | Umeda | .................. | F16C 33/30 384/450 |
| 9,593,718 B2 * | 3/2017 | Kario | ...................... | F16C 33/64 |
| 2005/0259896 A1 | 11/2005 | Kuo | | |
| 2013/0011089 A1 | 1/2013 | Frank | | |

FOREIGN PATENT DOCUMENTS

| | | |
|---|---|---|
| JP | 40-7608 B1 | 4/1965 |
| JP | 9-119510 A | 5/1997 |
| JP | 2002-5178 A | 1/2002 |
| JP | 2002-39190 A | 2/2002 |
| JP | 2005-331099 A | 12/2005 |
| JP | 2009-279627 A | 12/2009 |
| WO | WO 99/34023 A1 | 7/1999 |

OTHER PUBLICATIONS

International Search Report for PCT/JP2016/056470 dated Jun. 7, 2016.
Written Opinion of the International Searching Authority for PCT/JP2016/056470 (PCT/ISA/237) dated Jun. 7, 2016.
Extended European Search Report, dated Sep. 25, 2018, for corresponding European Application No. 16758972.0.

* cited by examiner

CONVENTIONAL SHAPE

SHAPE PRESCRIBED IN
PRESENT APPLICATION

SIMPLE INDENTATION MODEL

ROLLING MODEL

BALL BEARING AND METHODS OF PRODUCTION OF BALL BEARING

TECHNICAL FIELD

The present invention relates to a ball bearing and methods of production of a ball bearing keeping cracking from occurring and in turn realizing an extended lifespan.

BACKGROUND ART

The various machinery used in the ferrous metal, papermaking, wind power generation, mining, and other various fields, in automobiles, and in rolling stock all use various types of ball bearings. These ball bearings are used under harsh conditions under high loads, so cracks are liable to locally form.

Ball bearings are standardized in, for example, JIS-B1518. In this standard, in the case of a radial ball bearing, it is recommended that a cross-sectional profile line of a race at an inner race side (outer race side) (component of ball bearing defining and forming path over which rolling balls move) have a radius of curvature of a groove of 52% or less (53% or less) of a diameter of the rolling balls. On the other hand, in the case of a thrust ball bearing, it is recommended that both the cross-sectional profile lines of the upper race side and lower race side of races have a radius of curvature of the groove of 54% or less of the diameter of the rolling balls. However, in the ball bearings according to this standard, the cross-sectional profile line of the races are arcs having a single radius of curvature, so the contact area of the rolling balls and races at the time of a load cannot be sufficiently secured. For this reason, in particular at the time of a high load, a high pressure acts on the parts of the races contacting the rolling balls and those parts are liable to crack.

Therefore, in recent years, ball bearings reducing the pressure acting on the races and suppressing cracking (Japanese Patent Publication No. 2009-174691A: PLT 1) and rolling machine elements strikingly improving the load capacity and suppressing cracking (Japanese Patent No. 3608163: PLT 2) have been disclosed.

PLT 1 discloses a race having a cross-sectional profile line comprised of an arc part of the same radius as the radius of the rolling balls and tangential parts formed as extensions of the arc part. According to PLT 1, by selecting the circumferential length of the arc part suitably for the load, it is considered possible to suppress differential slip and sufficiently secure the contact area of the rolling balls and arc part to suppress the surface pressure applied to the race.

Further, PLT 2 discloses a race having a cross-sectional profile line comprised of a composite arc made of a plurality of arcs with different radii of curvature smoothly connected, in which plurality or arcs, the radius of curvature at the center in the width direction is relatively small and the radii of curvature at the two sides in the width direction are relatively large. According to PLT 2, by adopting this configuration, it is possible to reduce the pressure on the race. It is considered that this reduction of pressure can advantageously act against the rolling fatigue of the surface of the race and against overriding of the shoulders and can reduce differential slip.

Note that, in addition to PLTs 1 and 2, the technique of making the shape of the path of the rolling balls a secondary curve etc. (Japanese Patent Publication No. 40-7608B: PLT 3) and the technique of changing the radius of curvature of the curved path of the rolling balls from the groove bottom to the shoulder parts (Japanese Patent Publication No. 53-139047A: PLT 4) are disclosed.

SUMMARY OF INVENTION

Technical Problem

However, when, as shown in PLT 1 (PLT 2), the cross-sectional profile line of a race which the rolling elements contact is comprised of an arc and tangents (plurality of arcs), at the time of a high load, pressure excessively acts at the boundaries of the arc and tangents (boundaries of arcs with each other) and in turn cracking is liable to occur and the ball bearing is liable to be unable to prolonged in lifespan. Further, when the shape of the path of the rolling balls is abstractly specified like in PLT 3 (PLT 4), it is unclear if it is possible to reliably keep down the pressure applied to the race.

The present invention was made in consideration of this situation and has as its object the provision of a ball bearing and methods of production of a ball bearing keeping the pressure applied to a race from becoming locally higher at the time of high load to keep cracking from occurring and in turn realize an extended lifespan.

Solution to Problem

To solve the above problem, the present inventors in particular studied a ball bearing in which the path over which rolling elements move is defined and formed to prevent the surface pressure of the race contacting the rolling elements from becoming locally higher. As a result, they obtained the discovery that if the cross-sectional profile line of the part of the race contacting the rolling elements is not comprised of a plurality of functions such as curves and curves or curves and straight lines, that is, that if profile line is comprised of a specific single function, the surface pressure will no longer become locally high at the rolling elements and, as a result, cracking of the ball bearing is suppressed and in turn the ball bearing can be prolonged in lifespan.

Further, the present inventors also studied methods of production of a ball bearing. As a result, they obtained the discovery that a ball bearing can be obtained by cold forging or by machining, in particular in the case of cold forging, preferably by using a specific arc shaped die.

Based on the above discovery, the present inventors completed the invention. Its gist is as follows:

[1] A ball bearing comprising a pair of races and at least one rolling element movably clamped between the pair of races, characterized in that a cross-sectional profile line of a part of each of the pair of races contacting the rolling element takes a minimum value of curvature radius at a position sticking out the most in a first direction over which the pair of races face, the cross-sectional profile line becomes larger in radius of curvature the further from that position in a second direction vertical to the first direction in the cross-section, that cross-sectional profile line is comprised of a single function, and when a midpoint of the profile line in the second direction is the origin, an axis extending in the second direction is the X-axis and an axis extending in the first direction is the Y-axis, and a radius of the rolling element is R, the cross-sectional profile line satisfies equation (1):

$$X^2/\{2R(1+0.05)\} < Y < X^2/\{2R(1-0.05)\} \quad (1)$$

[2] A method of production of a ball bearing provided with a pair of races and at least one rolling element movably clamped between the pair of races, characterized in that the method of production of a ball bearing comprises a cold forging process of cold forging an arc shaped die with a radius of curvature "r" having a cross-sectional shape of a contact surface satisfying equation (2) into a race material so as to form a recessed part having a profile line satisfying equation (3):

$$(R \times d^{0.307}/0.550)^{1/1.28} \times (1-0.05) \leq r \leq (R \times d^{0.307}/0.550)^{1/1.28} \times (1+0.05) \quad (2)$$

$$X^2/\{2R(1+0.05)\} < Y < X^2/\{2R(1-0.05)\} \quad (3)$$

where
a radius of the rolling element is R,
in a cross-sectional view of the ball bearing, an axis extending in a first direction over which the pair of races face is the X-axis and an axis extending in a second direction vertical to the first direction is the Y-axis, and
a depth of a recessed part formed in the races in the first direction is "d".

[3] A method of production of a ball bearing provided with a pair of races and at least one rolling element movably clamped between the pair of races, characterized in that the method of production of a ball bearing comprises a machining process of machining the races material so as to form a recessed part of a depth "d" having a profile line satisfying equation (4):

$$X^2/\{2R(1+0.05)\} < Y < X^2/\{2R(1-0.05)\} \quad (4)$$

where
a radius of the rolling element is R and,
in a cross-sectional view of the ball bearing, an axis extending in a first direction over which the pair of races face is the X-axis and an axis extending in a second direction vertical to the first direction is the Y-axis.

[4] The method of production of a ball bearing according to [2] or [3], comprising
using the cold forging process or the machining process to work the races material and form an pre-finish product having a difference (d−a) of the depth "d" and "a" satisfying equation (5) as a depth of the recessed part in the first direction,
then successively performing
a heat treatment process of quenching and tempering the pre-finish product and
a cold forging process of cold forging an arc shaped die according to [2] into the heat treated pre-finish product:

$$0.1 \text{ mm} \leq a \leq 0.2 \text{ mm} \quad (5)$$

Advantageous Effects of Invention

In the ball bearing according to the present invention, the cross-sectional profile line of the part of a race contacting a rolling element and defining and forming a path over which the rolling ball moves is improved. As a result, according to the ball bearing according to the present invention, it is possible to avoid the surface pressure from becoming locally higher at that race at the time of a high load to keep cracking from occurring and in turn prolong the lifespan of the ball bearing. Further, according to the methods of production of a ball bearing according to the present invention, it is possible to suitably obtain a ball bearing having that performance.

BRIEF DESCRIPTION OF DRAWINGS

FIG. 7A shows a conventional case while FIG. 7B shows a case of the shape prescribed in the present application.

FIGS. 8A and 8B are views of models showing the initial states of two analyses performed, wherein FIG. 8A shows a simple indentation analysis model and FIG. 8B shows a rolling analysis model.

FIGS. 9A and 9B are graphs showing the results of investigation of changes in the contact pressure in 10-step increments (case of applying 18.33N for each step), wherein FIG. 9A shows the results relating to the conventional type shown in FIG. 7A, while FIG. 9B shows the results relating to the type prescribed in the present application shown in FIG. 7B.

FIGS. 13A and 13B are views showing the cross-sectional shapes of grooves for the races shown in Table 2, wherein FIG. 13A shows Sample No. 4 of Table 2, while FIG. 13B shows Sample No. 13 of Table 2.

DESCRIPTION OF EMBODIMENTS

Figure 1:
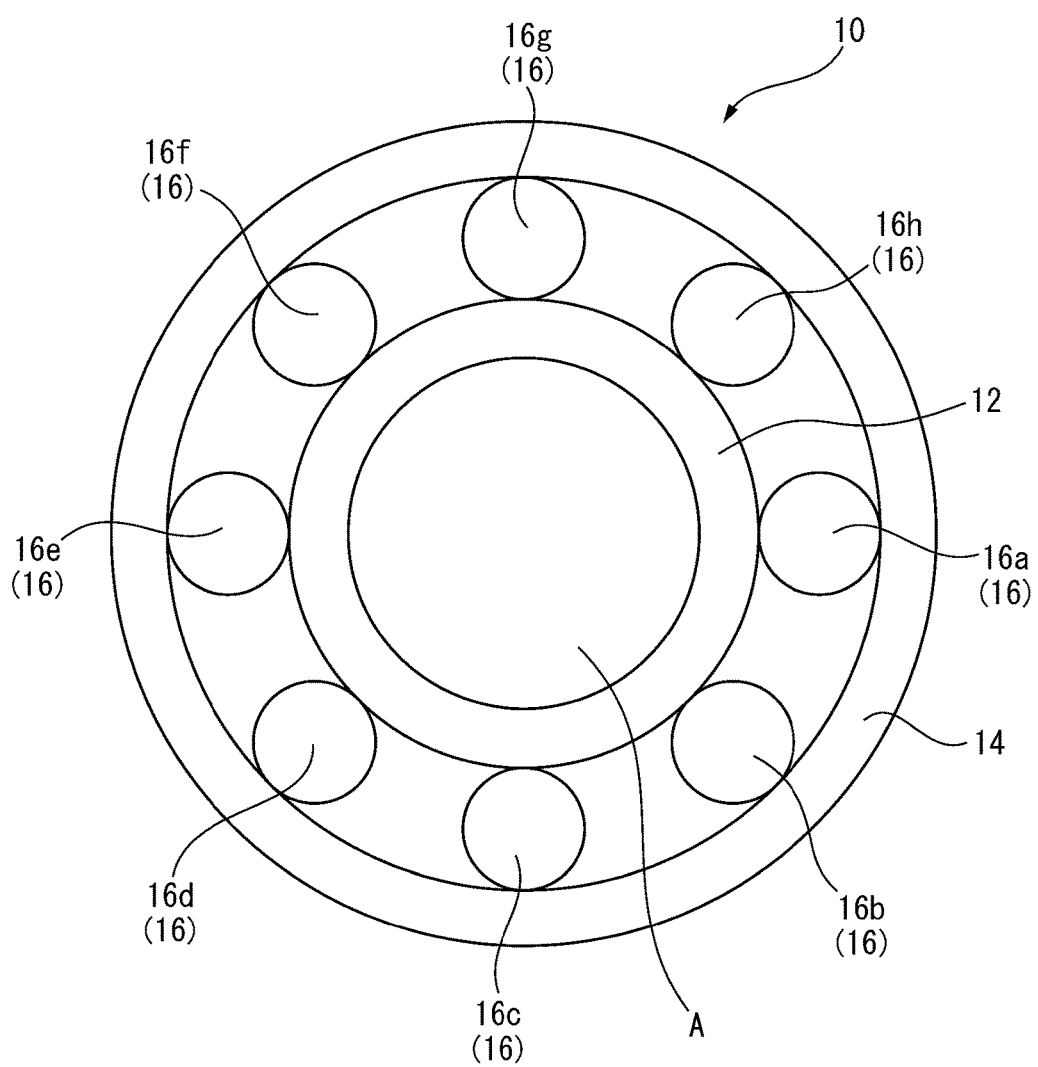
FIG. 1 is a plan view showing a radial ball bearing according to the present invention.

Below, embodiments of the ball bearing according to the present invention will be explained in detail. Note that, the following embodiments do not limit the present invention. Further, the components of the embodiments include ones which persons skilled in the art can easily substitute or ones substantially the same. Furthermore, the various modes included in the embodiments can be freely combined by persons skilled in the art to the extent self evident.

Ball Bearings
Discoveries of Present Inventors

To prolong the lifespan of a ball bearing, first, it is effective to reduce the maximum pressure applied to the pair of races defining and forming the path over which the rolling elements move (below, sometimes referred to as the "maximum surface pressure"). The maximum surface pressure usually becomes the surface pressure at the contact center of a race. Here, the "contact center of a race" means the position at the part where race and rolling element contact in the cross-sectional view at equal distances from the two end points of that contact part measured along that contact part.

This maximum surface pressure is proportional to the load and depends on the radius of curvature of the cross-sectional profile line of the race at the contact center. Specifically, the smaller the radius of curvature at the contact center, the smaller the maximum surface pressure. However, when the radius of curvature of the cross-sectional profile line of a race at the contact center is less than the radius of curvature of the rolling balls, at the time of no load, the rolling elements and the race will not contact at the contact center. As the load becomes larger, stress acts enlarging the groove (specifically, around contact center), so it is assumed the radius of curvature of the cross-sectional profile line at the contact center becomes a radius of curvature of the rolling elements or more.

Assuming the maximum surface pressure is suitably controlled in this way, to prolong the lifespan of a ball bearing at a high level, in particular, rather than form the cross-sectional profile line of a race by combining a plurality of functions, it is effective to form it by a specific single function. This is because when forming that profile line by a plurality of functions, the surface pressure becomes higher at the boundary points of the functions and in turn induces cracking.

Due to the above, if making the cross-sectional profile line of a race a specific single function where the radius of curvature is the smallest at the contact center (usually, the groove bottom) and the radius of curvature becomes larger the further from the groove bottom, it is possible to reduce the maximum surface pressure. Assuming this, since there are no boundaries between functions, it is possible to suppress the occurrence of locations with a high surface pressure. Due to this, it is possible to keep the components of the ball bearing, that is, the pair of races, from cracking, at a high level and in turn possible to prolong the lifespan of the ball bearing. The present inventors obtained this discovery and completed the invention shown below.

First Embodiment (Radial Ball Bearing)

FIG. 1 is a plan view showing a radial ball bearing according to the present invention. The radial ball bearing 10 shown in the figure is comprised of a pair of races (inner race 12, outer race 14) and at least one rolling element (eight in example shown in figure) movably clamped between the pair of races 12, 14 (rolling balls 16a, 16b, 16c, 16d, 16e, 16f, 16g, 16h).

In the radial ball bearing 10 shown in FIG. 1, due to this configuration, for example, a shaft A is fit with the inner race 12 and the outer race 14 is fixed. In that state, the inner race 12 rotates by the rolling balls 16a to 16h moving.

Specifically, when the inner race 12 is rotating, in FIG. 1, the rolling balls 16a to 16h rotate while rolling clockwise or counterclockwise (revolving around the axis A) and the inner race 12 contacting these rolling balls 16a to 16h rotates in the same direction as the direction of revolution of the rolling balls 16a to 16h.

Figure 2:
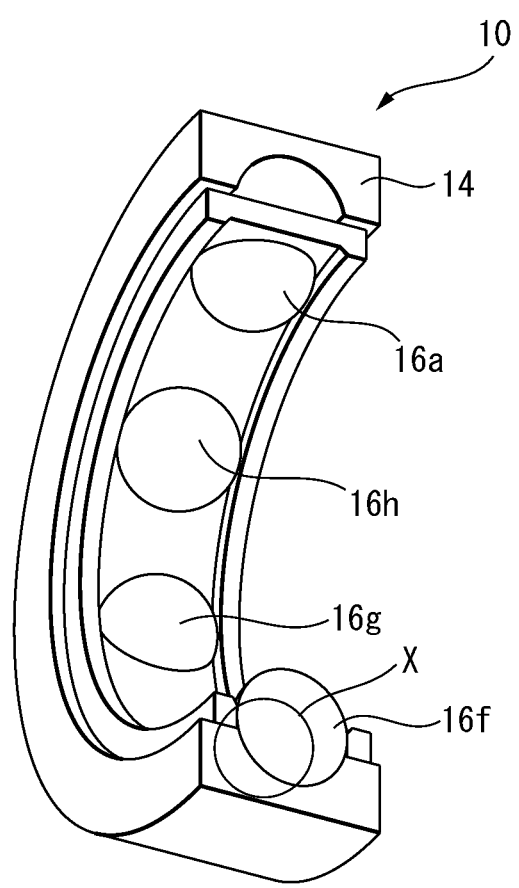
FIG. 2 is a partially cross-sectional perspective view of the ball bearing shown in FIG. 1.
Figure 3:
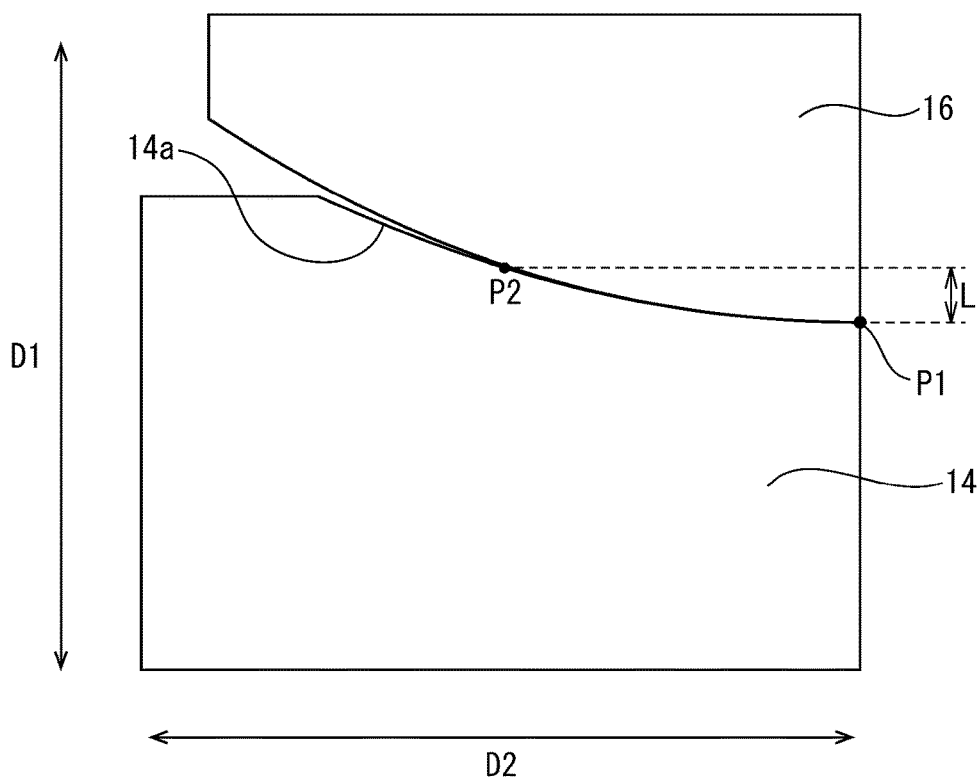
FIG. 3 is an enlarged view showing a circled part X of FIG. 2.

FIG. 2 is a partially cross-sectional perspective view of the ball bearing shown in FIG. 1, while FIG. 3 is an enlarged view showing the circled part X of FIG. 2. That is, FIG. 3 is a view showing a cross-sectional profile line 14a of one of the races shown in FIG. 1, that is, the outer race 14. According to this figure, the cross-sectional profile line 14a becomes the smallest in radius of curvature at the position sticking out the most in the first direction D1 over which the pair of races 12, 14 face (right end point P1) and becomes greater in radius of curvature the further from the position P1 in a second direction D2 vertical to the first direction D1 in cross-section and is comprised of a single function.

Note that, in FIG. 3, only half of the cross-sectional profile line 14a is shown, but in actuality, at the right side of the point P1 of FIG. 3 as well, the cross-sectional profile line 14a extends symmetrically about the point P1. Further, in FIG. 3, the cross-sectional profile line 14a of one of the races, that is, the outer race 14, was shown, but in the present embodiment, the cross-sectional profile line of the other of races, the not shown inner race 12, also has a similar structure.

Figure 4:
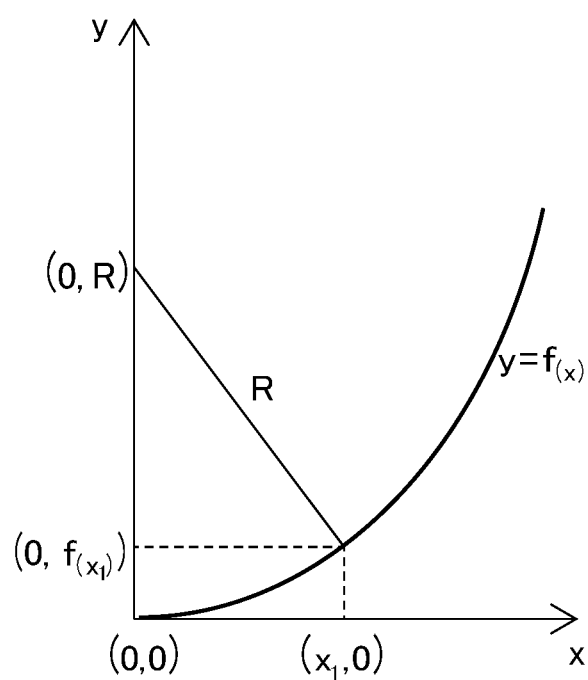
FIG. 4 is a view showing a method of derivation of a radius of curvature for a cross-sectional profile line of a race forming the ball bearing according to the present invention.

Under such an assumption, the single function according to the present embodiment is specifically as follows:

FIG. 4 is a view showing the method of deriving the radius of curvature of the cross-sectional profile line of a race forming the ball bearing according to the present invention. As shown in this figure, if making the radius of curvature of the rolling elements (rolling balls) contacting the groove bottom R, R can be expressed by equation (6) using the Pythagorean theorem:

$$(R-f_{(x_1)})^2 + x_1^2 = R^2 \tag{6}$$

If cleaning up equation (6) by R, equation (7) is obtained:

$$R = \frac{x_1^2 + f_{(x_1)}^2}{2 f_{(x_1)}} \tag{7}$$

As the curve where the radius of curvature is the smallest at the contact center (groove bottom) and the radius of curvature of the rolling ball becomes larger the further from the groove bottom, an ellipse, 2D curve, etc. may be considered. In this Specification, in equation (6), f(x) is made a secondary function of equation (8):

$$f_{(x)} = ax^2 \tag{8}$$

If entering equation (8) into equation (7), equation (9) is obtained.

$$R = \frac{1}{2a} + \frac{ax_1^2}{2} \tag{9}$$

When the radius of curvature R' at the groove bottom is equal to the radius of curvature R of the rolling balls, no stress acts enlarging the groove and the contact surface pressure becomes minimum. The groove bottom is $X_1=0$ in FIG. 4, so the radius of curvature R' at the groove bottom becomes R'=½a in equation (9) assuming $X_1=0$. For this reason, a=½R. This is entered into equation (8) to obtain the equation (10).

$$y = \frac{x^2}{2R} \quad (10)$$

Note that, the shape of the cross-sectional profile line of the race obtained in equation (10) is the target value. For this reason, it is critical to consider the processing precision, so error of ±5% is added to the radius of curvature R of the rolling ball like in equation (11). Note that, the error is preferably 0% to 5%.

$$\frac{x^2}{2R(1+0.05)} < y < \frac{x^2}{2R(1-0.05)} \quad (11)$$

In the present embodiment, the cross-sectional profile line 14a takes a minimum value of curvature radius at the position P1 sticking out the most in the first direction D1 and becomes larger in radius of curvature the further from the position P1 toward the second direction D2. Usually, the maximum surface pressure of the races 12, 14 is applied to the contact center P1 of the races 12, 14. The smaller the radius of curvature at the contact center P1, the smaller the maximum surface pressure. By employing this configuration, it is possible to reduce the maximum surface pressure applied to the races 12, 14 (action 1).

Further, in the present embodiment, the cross-sectional profile line 14a is comprised of a specific single function, so the cross-sectional profile line 14a smoothly extends. For this reason, among the points on the cross-sectional profile line 14a, there are no points where the surface pressure becomes remarkably higher than the other points (action 2).

Due to the above, according to the radial ball bearing according to the present embodiment, the action 1 (action suppressing the maximum surface pressure) and the action 2 (action preventing locations where surface pressure is excessively applied) combine whereby at the time of a load on the inner race 12 and outer race 14 of the rolling balls 16, cracking at the races (inner race 12 and outer race 14) can be suppressed at a high level and in turn the lifespan of the ball bearing can be prolonged.

Note that, in the present embodiment, for the processing precision, as explained above, the reason for allowing an error of ±5% is as follows. That is, when the error is negative, the radius of curvature of the groove bottom becomes smaller than the radius of the rolling ball. At the time of no load, the groove bottom no longer contacts the rolling balls. For this reason, the rolling ball and rolling groove contact each other at two points. At the time of a load, the stress enlarging the rolling groove increases. Under such circumstances, at the time of load, the increase in the contact area causes the maximum surface pressure to decrease and the differential slip to increase. Therefore, considering the decrease in maximum surface pressure and increase in differential slip, the allowable range of the negative error was made less than −5%. However, if the error is negative, the stress enlarging the rolling width increases, so if possible negative error should be avoided. On the other hand, if the error is positive, the radius of curvature of the groove bottom becomes larger than the radius of the rolling balls. In the no load state, the rolling balls contact the groove bottom at one point. For this reason, the stress enlarging the rolling width does not increase. However, if the error becomes larger, the maximum surface pressure increases, so the upper limit is made less than +5% where the stress becomes equal to the maximum stress of the arc shaped groove.

Second Embodiment (Thrust Ball Bearing)

Figure 5:
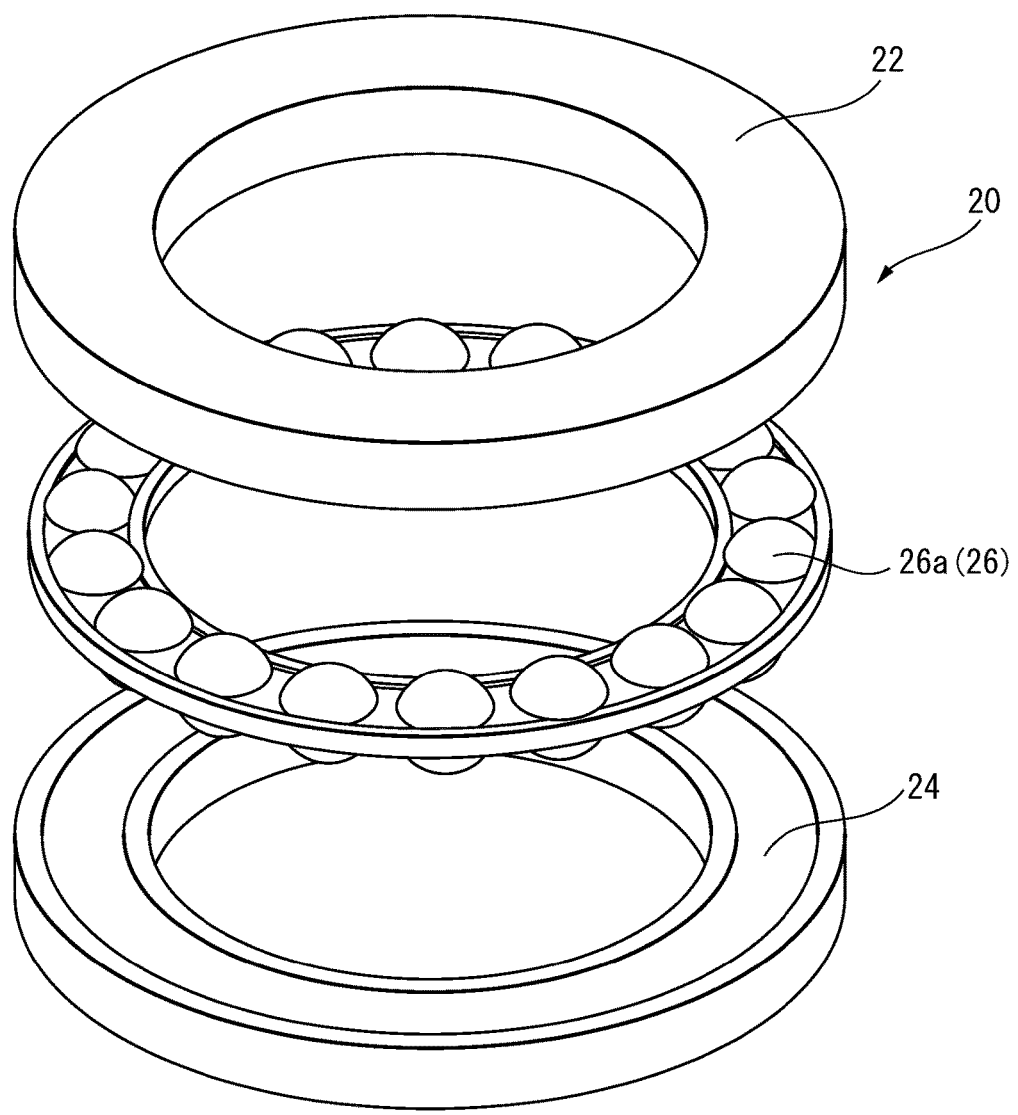
FIG. 5 is a disassembled perspective view showing a thrust ball bearing according to the present invention.

FIG. 5 is a disassembled perspective view showing a thrust ball bearing according to the present invention. The thrust ball bearing 20 shown in this figure is provided with a pair of races (upper race 22, lower race 24) and at least one (in the example shown in the figure, a plurality of) rolling elements (rolling balls 26a etc.) movably clamped between the pair of races 22, 24.

In the thrust ball bearing 20 shown in FIG. 5, due to this configuration, for example, in the state where the upper race 22, rolling elements 26, and lower race 24 are assembled, a shaft (not shown) is fit through the ball bearing 20. Along with this, for example, in the state with the lower race 24 fixed in place, the upper race 22 rotates by the movement of the rolling balls 26a etc.

Specifically, when the upper race 22 is rotating, in FIG. 5, the rolling balls 26a etc. rotate while rolling clockwise or counterclockwise (revolving around shaft). The upper race 22 contacting these rolling balls 16a etc. rotates in the same direction as the rolling direction of the rolling balls 26a etc.

Figure 6:
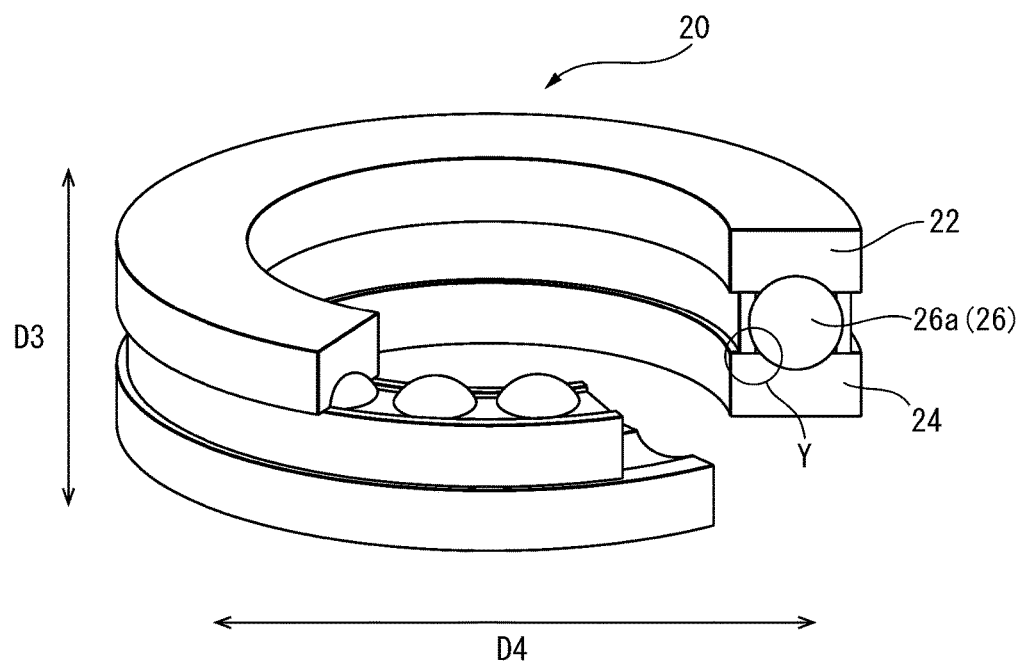
FIG. 6 is a partially cross-sectional perspective view of the ball bearing shown in FIG. 5.

FIG. 6 is a partially cross-sectional perspective view of the ball bearing shown in FIG. 5. Note that, in FIG. 6, the circled part Y is a part including the cross-sectional profile line of one of the races shown in FIG. 5, that is, the lower race 24. The cross-sectional profile line of the lower race 24 included in the circled part Y is the same in shape as the cross-sectional profile line 14a of the inner race 12 of the above-mentioned radial bearing (first embodiment) (FIG. 3). For this reason, the cross-sectional profile line of the lower race 24 shown in FIG. 6 takes a minimum value of curvature radius at the position sticking out the most in the first direction D3 over which the pair of races 22, 24 face and becomes larger in radius of curvature the further from that position in the second direction D4 vertical to the first direction D3 in that cross-section and is comprised of a specific single function.

Note that, in FIG. 6, not only the profile line of one of the races, that is, the lower race 24, but also the profile line of the other of the races, that is, the upper race 22, have similar structures.

In the present embodiment as well, the cross-sectional profile lines of the pair of races 22, 24 become smallest in radius of curvature at the positions sticking out the most in the first direction D3 and become larger in radius of curvature the further from this position toward the second direction D4. For this reason, it is possible to reduce the maximum surface pressure applied to the races 22, 24 (action 3).

Furthermore, in the present embodiment as well, since the cross-sectional profile line is a specific single function, the cross-sectional profile line smoothly extends. For this reason, among the points on the cross-sectional profile line, there are no points where the surface pressure becomes remarkably higher than other points (action 4).

Due to the above, for the thrust ball bearing according to the present embodiment as well, in the same way as the case of the above-mentioned radial ball bearing, the action 3 (action of suppressing maximum surface pressure) and action 4 (action of preventing location where surface pressure excessively acts) combine so that when a load is applied from the rolling balls 26a etc. to the upper race 22 and lower race 24, cracking at the races (upper race 22 and lower race 24) can be suppressed at a high level and in turn the ball bearing can be prolonged in lifespan.

Method of Production of Ball Bearing
Discovery of Inventors

The above-mentioned ball bearing (radial ball bearing and thrust ball bearing) is preferably one broadly produced by persons skilled in the art, that is, one able to be produced by various diverse methods. From such a viewpoint, the present inventors studied the method of production of a ball bearing provided with a race having a recessed part having a cross-sectional profile line satisfying equation (12):

$$X^2/\{2R(1+0.05)\}<Y<X^2/\{2R(1-0.05)\} \tag{12}$$

As a result, the inventors obtained the discovery that such a ball bearing can be produced by at least one cold forging operation, by machining, or by a combination of machining and cold forging.

Specifically, the present inventors obtained the discovery that when producing the above-mentioned ball bearing by one or more cold forging operations, by using a specific arc shaped die (top punch), it is possible to obtain a race having a recessed part of a cross-sectional profile line satisfying equation (12). Further, the present inventors obtained the discovery that when producing the above-mentioned ball bearing by machining, any known technique may be used to obtain a race having a recessed part of a cross-sectional profile line satisfying equation (12).

Furthermore, the present inventors obtained the discovery that when forming the recessed part by multiple stages (for example, by a plurality of cold forging operations or by at least one machining operation and at least one cold forging operation), the cross-sectional profile line of the recessed part can be formed by a high precision. In addition, the present inventors obtained the discovery that when in this way forming a recessed part by a multiple stage process including QT treatment, it is possible to form a desired recessed part without the surface of the recessed part cracking and, in particular, it is possible to efficiently suppress cracking etc. even when the final form of the races is relatively hard. The present inventors completed the invention shown below by obtaining such discoveries.

Third Embodiment (Method of Production of Ball Bearing Including Cold Forging)

The present embodiment is a method of production of a ball bearing including at least one cold forging operation. That method of production is a method of production of a ball bearing 10 comprising, for example, as shown in FIG. 1, a pair of races 12, 14 and at least one rolling element 16 (16a to 16h) movably clamped between the pair of races 12, 14.

The radius of curvature of the groove bottom of the groove formed by cold forging depends on the radius of curvature of the projecting part of the arc shaped die (top punch) and the amount of indentation. The smaller the radius of curvature of the projecting part or the larger the amount of indentation, the smaller the radius of curvature of the groove bottom. This is due to the workpiece (race material) being an elastic-plastic body.

Further, the groove depth in a workpiece depends on the amount of indentation and the material. That is, the larger the amount of indentation, the deeper the groove that is formed. Even with the same amount of indentation, the groove formed becomes shallower in the case of a hard material.

The relationship of the depth "d" of the groove formed, the radius of curvature "r" of the projecting part of the arc shaped die, and the radius of curvature R' of the bottom of the groove formed can be expressed by equation (13):

$$R'=0.550r^{1.28}d^{-0.307} \tag{13}$$

When using cold forging to form a rolling groove, if designating the radius of the rolling ball as R, the groove depth as "d", and the radius of curvature of the groove bottom as R', to prevent detachment from the race, preferably d≥0.1R. To keep the maximum surface pressure low, preferably 1.05R≥R'≥R.

Next, if studying the range which is able to be taken by the radius of curvature "r" of the projecting part of the arc shaped die satisfying such a relationship, if the error of "r" becomes ±5% or more, it becomes difficult to form the recessed part of the profile line at the race satisfying equation (12) with a high precision. Note that, to form the recessed part of the profile line with a higher precision, preferably the error of "r" is made 0% to 5%.

Therefore, the radius of curvature "r" of the projecting part of the arc shaped die becomes as shown in equation (14).

$$(R\times d^{0.307}/0.550)^{1/1.28}\times(1-0.05)\leq r\leq (R\times d^{0.307}/0.550)^{1/1.28}\times(1+0.05) \tag{14}$$

Due to the above, the method of production of a ball bearing according to the present embodiment includes a cold forging process of cold forging an arc shaped die with a radius of curvature "r" having a cross-sectional shape of a contact surface satisfying equation (14) into a race material, where a radius of the rolling element 16 is R, in a cross-sectional view of the ball bearing 10 (for example, in the case shown in FIG. 1), an axis extending in a first direction over which the pair of races 12, 14 face is the Y-axis and an axis extending in a second direction vertical (perpendicular) to the first direction is the X-axis, and a depth of a recessed part formed in the races 12, 14 in the first direction is "d".

By going through such a cold forging process, the races 12, 14 can be formed with recessed parts having profile lines satisfying the equation (12).

Fourth Embodiment (Method of Production of Ball Bearing Including Machining)

The present embodiment is a method of production of a ball bearing including a machining process. The method of production of the present embodiment is also, like the method of production of a ball bearing according to the third embodiment, for example, a method of production of a ball bearing 10 (including races 12, 14) shown in the FIG. 1. In the present embodiment, as the machining process, any known machining method can be employed. According to the present embodiment, it is possible to go through this machining process to form a recessed part having a profile line satisfying the equation (12) in the races 12, 14.

Fifth Embodiment (Method of Production of Ball Bearing Forming Recessed Part in Multiple Stages)

The present embodiment is a method of production of a ball bearing forming a recessed part in a race by multiple stages. For example, a cold forging operation like in the third embodiment or machining operation like in the fourth embodiment is performed for the race material to obtain an pre-finish product, then that pre-finish product is heat treated for quenching and tempering, next, the arc shaped die used in the third embodiment is cold forged into the heat treated pre-finish product.

In particular, when forming the recessed part in a race material by two stages, if designating the depth of the recessed part formed by the first cold forging or machining operation as $d_1$ and the additional depth of the recessed part formed by the second and later cold forging as $d_2$, the equation (13) is rewritten such as shown in equation (15):

$$R'=0.550r^{1.28}(d_1+d_2)^{-0.307} \quad (15)$$

Note that, when forming the recessed part in the race material by one stage, if designating the depth of the recessed part formed by the first cold forging or machining operation as $d_1$ and designating the radius of curvature of the groove bottom at that time as $R_1'$, the equation (15) is rewritten such as shown in equation (16):

$$R_1'=0.550r^{1.28}(d_1)^{-0.307} \quad (16)$$

Here, if studying the range of possible radius of curvature "r" of the projecting part of the arc shaped die when forming the recessed part in the race material in two stages, the error $\Delta$ % of the above-mentioned radius of curvature "r" can be expressed like in equation (17):

$$\Delta = \left(\left(\frac{\exp\left(\frac{-\ln\left(\frac{R_2}{0.55r^{1.28}}\right)}{0.307}\right)+d_2}{d_1+d_2}\right)^{-0.307}-1\right)\times 100 \quad (17)$$

$R_2$: radius of curvature at groove bottom of recessed part at end of first stage (for example, at end of machining process)

r: radius of curvature of projecting part of arc shaped die

For example, if, in equation (17), r: 5.1 mm, $d_1$: 0.4 mm, and $d_2$: 0.2 mm, from equation (16), the radius of curvature $R_1$ of the groove bottom at the time of the end of the first stage (cold forging) becomes 5.86 mm. Here, as the first stage, instead of cold forging, machining is used to obtain a recessed part of a radius of curvature $R_2$: 6.33 mm having an error of +7.92%. If performing the second stage (cold forging) for the obtained recessed part, from equation (17), the radius of curvature becomes 4.99% larger than the target value "r", but is within ±5.0% of the target radius of curvature "r" and within the scope of the present application. Note that, even when changing the curvature of the arc shaped die in the first stage and second stage, this technique can be used to estimate the curvature of the groove bottom after the second stage.

Note that, in the methods of production of a ball bearing according to the third embodiment to the fifth embodiment shown above, it is preferable to perform at least one type of treatment of quenching and tempering (QT), spheroidal annealing (SA), and polishing either before or after the first stage or both since it enables the surface conditions of the race to be made even. However, when performing QT to harden the race, then cold forging it like in the present application, from the viewpoint of suppressing cracking etc., it is preferable that the increase in the depth of the recessed part formed in the race after QT be made 0.2 mm or less.

That is, when forming a recessed part in a race by two stages, in particular, when performing QT after the end of a first stage, it is preferable to set the groove depth of the recessed part relatively large in the first stage before the race is hardened and to set the groove depth of the recessed part relatively small in the second stage after the race is hardened. Due to this, at the end of the second stage, it is possible to efficiently suppress cracking at the groove bottom of the recessed part of the race and its vicinity.

Due to the above, according to the methods of production of a ball bearing according to the present invention, it is possible to advantageously form a race having a recessed part of the cross-sectional profile line of a secondary function, possible to make the radius of curvature of the groove bottom of the recessed part seen in cross-section approach the radius of the rolling balls, and in turn possible to increase the fatigue life of the ball bearings.

EXAMPLES

Ball Bearing

Figure 7A:
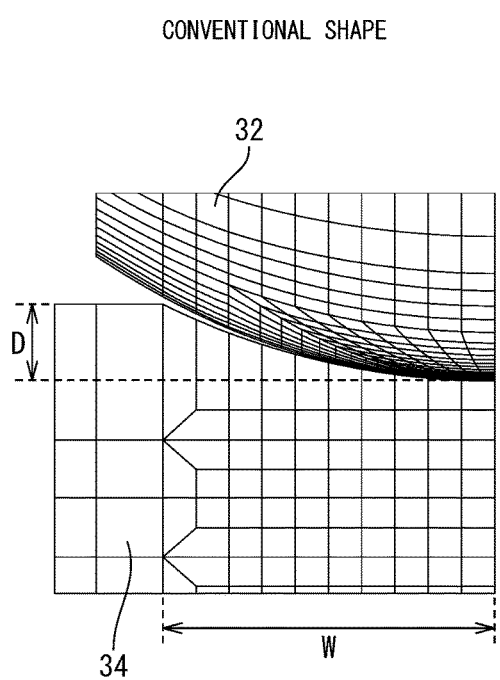
FIGS. 7A and 7B are views showing FEM models prepared for the cross-sectional profile line of a race forming a ball bearing, where
Figure 7B:
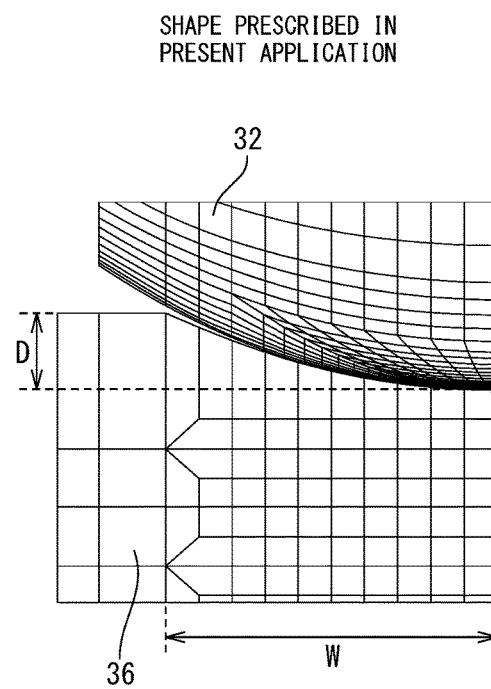

First, an example relating to a ball bearing will be explained. FIGS. 7A and 7B are views showing FEM models prepared for the cross-sectional profile lines of races forming ball bearings, wherein FIG. 7A shows the case of a conventional shape while FIG. 7B shows the case of a shape prescribed in the present application. As shown in the figure, FEM (finite element method) models were prepared for the cross-sectional profile lines of races forming ball bearings for the case of a conventional shape (circle of constant radius of curvature) (FIG. 7A) and the case of a shape prescribed in the present application (as one example, a secondary curve ($Y=aX^2$ ("a" is constant))) (FIG. 7B). Note that, in preparing these two types of models, the groove width (5.0 mm) and groove depth (0.656 mm) were made the same. Further, in FIG. 7, reference numeral 32 shows a rolling ball, while reference numerals 34 and 36 show races. Furthermore, in FIG. 7B, the radius of curvature of the groove bottom was made the same as the radius of curvature of the rolling ball (4.7625 mm). In this case, the constant "a" of the secondary curve was 0.105. Note that, when the radius of curvature of the rolling ball is 4.7625 mm, the constants multiplied with the secondary functions at the left side and right side in the equation (12) are respectively about 0.0999875 and about 0.1105125, so the secondary curve employing the constant "a" (0.105) satisfies the equation (12).

In this regard, the radius of curvature R' of the arc shaped groove shown in FIG. 7A can be expressed as shown in equation (18) using the groove depth D and ½ groove width W:

$$R' = \frac{D^2+w^2}{2D} \quad (18)$$

Here, if entering ½ groove width W=2.5 mm and groove depth D=0.656 mm, a radius of curvature R'=5.091 mm is obtained. In the FEM model of the conventional shape the same in groove width (5.0 mm) and groove depth (0.656 mm) as the shape prescribed in the present application, the radius of curvature of the single curvature arc groove was made 5.091 mm.

As clear from the shapes of the FEM models shown in FIGS. 7A and 7B, compared with the gap between the rolling ball 32 and race 34 in the conventional shape (FIG. 7A), the gap between the rolling ball 32 and race 36 in the shape prescribed in the present application (FIG. 7B) is smaller. Due to this, with the type of FIG. 7B, the contact area of the rolling ball 32 and the race 36 becomes large. In other words, it is expected that the contact surface pressure will be low.

Assuming this, using the FEM models shown in FIGS. 7A and 7B, two types of analyses of the simple indentation analysis and rolling analysis were performed for the purpose of clarifying the differences in surface pressures generated. These analyses were all elastic analyses. As common items of the analysis conditions, rolling balls made of silicon nitride ($Si_3N_4$) (modulus of elasticity: 300 GPa, Poisson ratio: 0.28) were used and test pieces (modulus of elasticity: 190 GPa, Poisson ratio: 0.3) were used. The Coulomb friction coefficient of the rolling balls and test pieces was 0.05, while the solver used was Marc ver.2012r1.

Figure 8A:
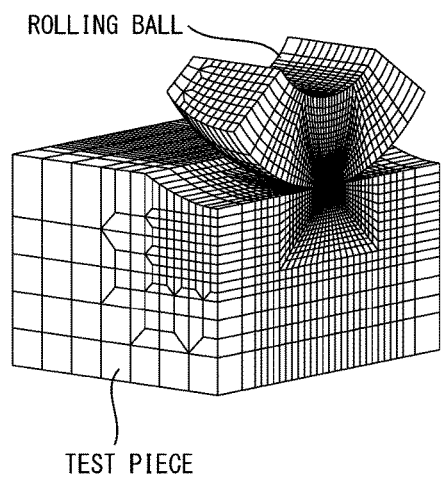
Figure 8B:
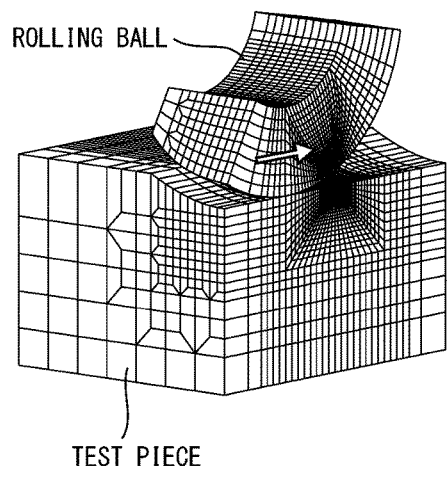

FIGS. 8A and 8B are model diagrams showing initial states of two analyses performed, wherein FIG. 8A shows the simple indentation analysis model while FIG. 8B shows the rolling analysis model. In the simple indentation analysis, the finely divided parts of the meshes of the center of the test piece and center of the rolling ball are made to contact each other and a maximum load of 1833N is applied in 100 steps for the analysis. As opposed to this, in the rolling analysis, at the initial period, a rolling ball was placed at a slant at a location 2 mm away from the center of a test piece, a maximum load of 1833N was applied in 100 steps, then a rigid body controlling the movement of the rolling ball was moved in a direction along the groove by 4 mm in 400 steps to simulate a rolling. Note that, at the time the rolling ball rolls 2 mm, the fine mesh parts of the test piece and the rolling ball are made to contact each other.

Figure 9B:
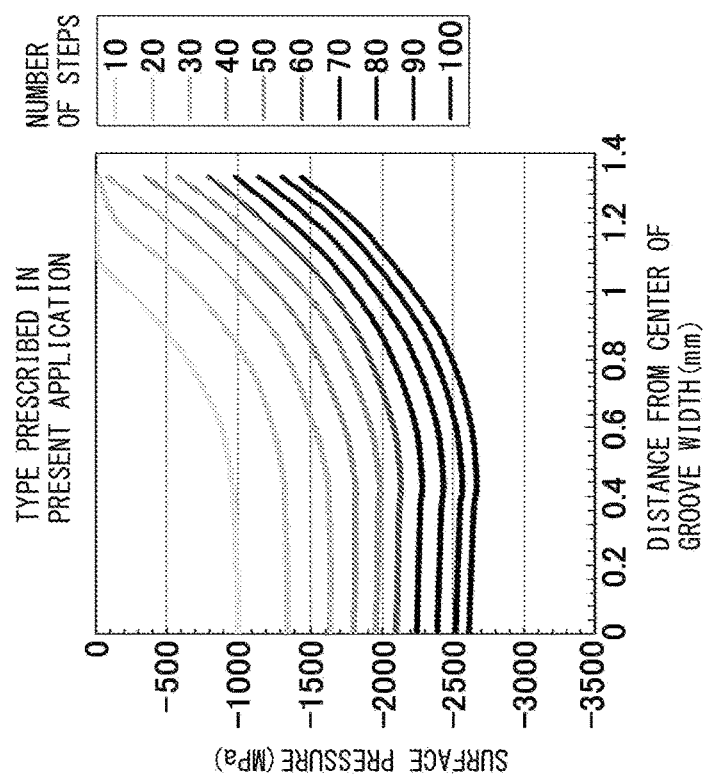
Figure 9A:
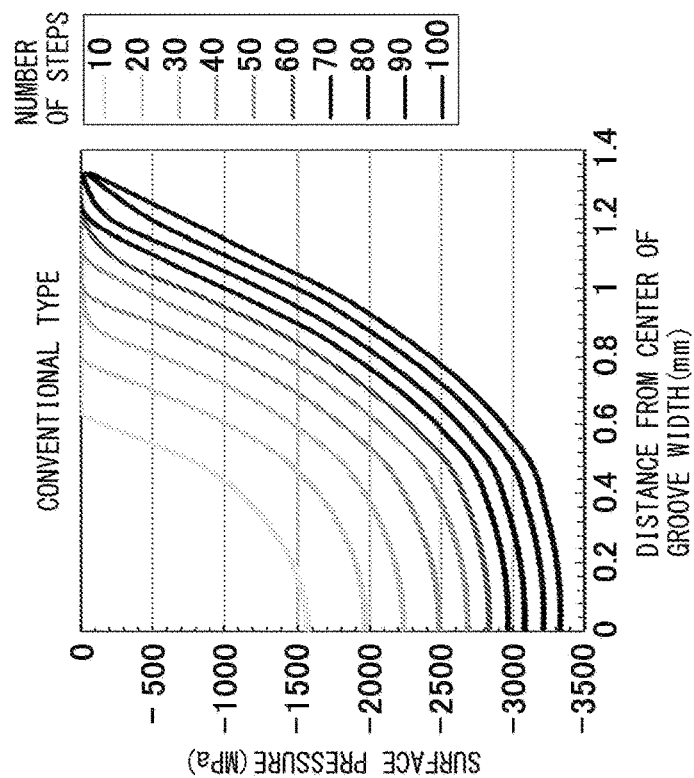

FIGS. 9A and 9B are graphs showing the results of the simple indentation analysis shown in FIG. 8A designed to clarify that the maximum surface pressure of the type prescribed in the present application (secondary curve groove etc.) is lower compared with the maximum surface pressure of the conventional type (single arc groove) and show the results of investigation of the change of the contact surface pressure in 10 step increments (in the case of applying 18.33N for each step) in the cases of the two types of FEM models shown in FIGS. 7A and 7B, wherein FIG. 9A shows the results relating to the conventional type and FIG. 9B shows the results relating to the type prescribed in the present application. Note that, in FIGS. 9A and 9B, the ordinates show the surface pressure (negative value means compression), while the abscissas show positions from the contact center in the groove width direction. As clear from FIGS. 9A and 9B, it is learned that with a secondary curve groove, compared to a single arc groove, the contact length at the same load becomes larger and as a result the contact area increases, whereby the surface pressure becomes smaller. Therefore, based on the results, it is believed that with a secondary curve groove, compared with a single arc groove, the maximum surface pressure is lower.

Figure 10:
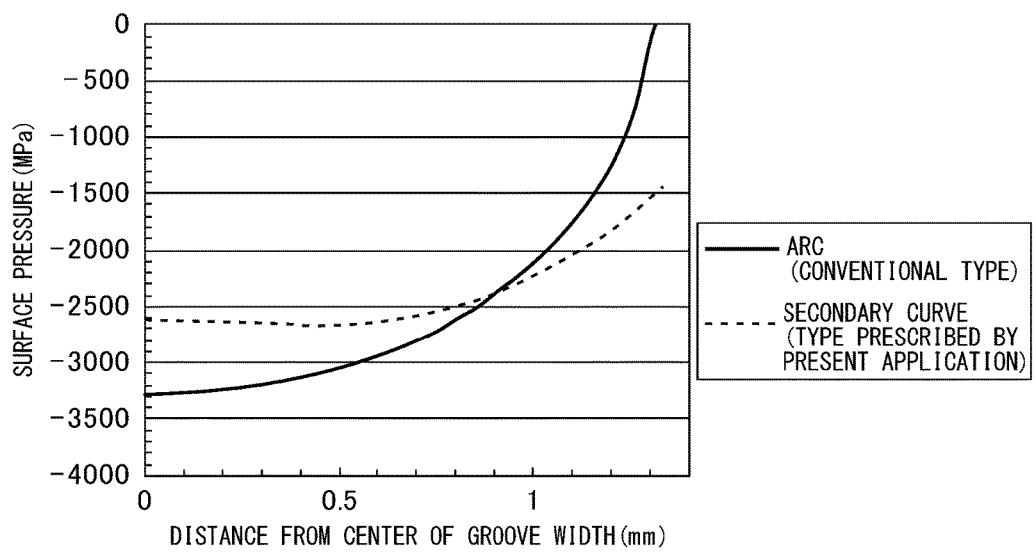
FIG. 10 is a graph showing the distribution of surface pressure when a maximum load of 1833N is applied in each of the cases of the two types of FEM models shown in FIG. 7.

FIG. 10 is a graph showing the results of the rolling analysis shown in FIG. 8B and shows the distribution of surface pressure when the maximum load of 1833N is applied in the cases of the two types of FEM models shown in FIGS. 7A and 7B. As clear from FIG. 10, it is learned that when the cross-sectional profile line of a race forming the ball bearing is a secondary curve, compared to when that cross-sectional profile line is a single arc, the change of the surface pressure due to the distance from the center of groove width becomes smaller, in particular, the surface pressure becomes still smaller if the distance from the center of the groove width is less than about 1 mm.

Figure 11:
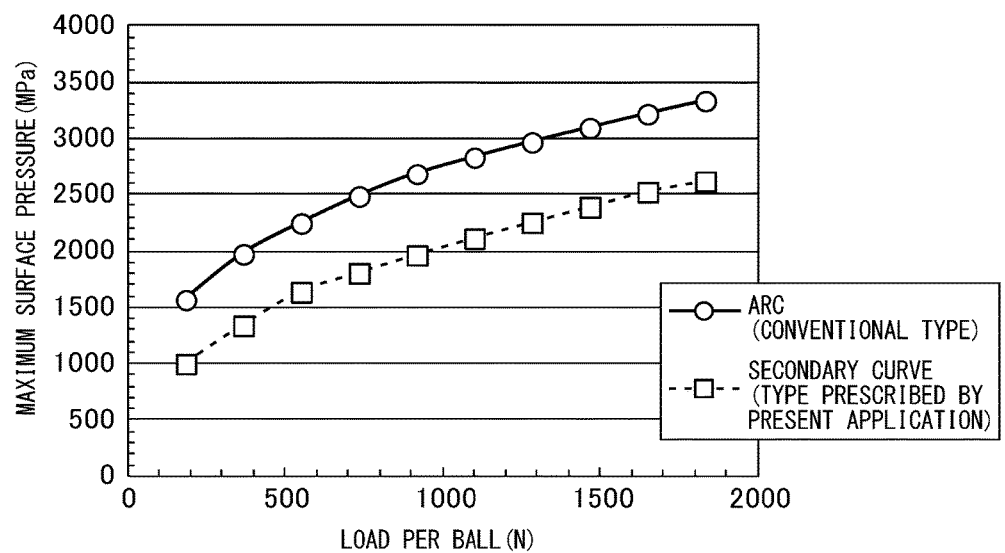
FIG. 11 is a graph showing the relationship between the maximum surface pressure and the load per ball in each of the cases of the two types of FEM models shown in FIG. 7.

FIG. 11 is a graph showing the relationship between the maximum surface pressure and the load per ball in the different cases of the two types of FEM models shown in FIGS. 7A and 7B. As clear from FIG. 11, it was learned that when the cross-sectional profile line of the race of a ball bearing is a secondary curve, compared with when that cross-sectional profile line is a single arc, it is effective to lower the surface pressure. This is important in suppressing cracking. Therefore, based on this result as well, it can be said that with a secondary curve groove, compared with a single arc groove, the maximum surface pressure is lower.

From the above results, according to the type of shape of ball bearing prescribed in the present application, the action of suppressing the maximum surface pressure is verified.

Further, in the ball bearing prescribed in the present application, the cross-sectional profile line of the race is comprised of a specific single function (secondary curve), so the cross-sectional profile line has no point not smoothly extending, so among the points on the cross-sectional profile line, there are no points with surface pressures remarkably higher than other points. Therefore, according to the ball bearing prescribed in the present application, naturally there is no location at which the surface pressure is excessively applied (action preventing locations where surface pressure is excessively applied).

Therefore, according to the ball bearing prescribed in the present application, it can be said that the action suppressing the maximum surface pressure and the action preventing locations where surface pressure is excessively applied combine whereby at the time of load of the rolling balls etc. on a race, cracking at the race can be suppressed at a high level and in turn the lifespan of the ball bearing can be prolonged.

Methods of Production of Ball Bearing

Next, examples relating to the methods of production of a ball bearing will be explained.

Figure 12:
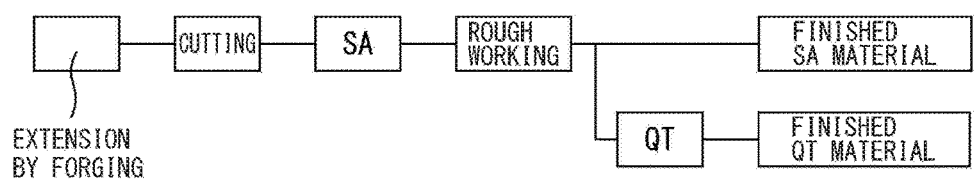
FIG. 12 is a flow chart showing a process of production of a material of the ball bearing of the present invention.

Example Relating to Relationship of Groove Depth and Radius of Curvature of Groove Bottom From a ϕ90 SUJ2 rod of the composition shown in Table 1, two types of test pieces for cold forging use (corresponding to race material of ball bearing) obtained after the heat treatment processes shown in FIG. 12 (units: mass %) were prepared.

TABLE 1

| C | Si | Mn | P | S | Cu | Ni | Cr | Al | O |
|---|----|----|---|---|----|----|----|----|---|
| 0.99 | 0.24 | 0.37 | 0.009 | 0.001 | 0.01 | 0.03 | 1.42 | 0.012 | 0.0008 |

That is, as shown in FIG. 12, a steel material of the composition shown in Table 1 was extended by forging at 1200° C., 1 heat, from ϕ90 mm to ϕ60 mm, cut to 60ϕ mm×300 mm, spheroidally annealed (SA), then roughly worked (outside diameter 52.5 mm×inside diameter 27.0 mm×length 6.0 mm). Next, the roughly worked material was used as is as the finished SA material (outside diameter 52.5 mm×inside diameter 27.2 mm×length 5.5 mm) and was quenched and tempered (QT) to obtain a finished QT material (outside diameter 52.0 mm×inside diameter 27.2 mm×length 5.5 mm).

Next, the finished SA material obtained in the above-mentioned way (below, sometimes called the "SA material") and finished QT material (below, sometimes called the "QT material") were cold forged. For that cold forging, a general cold forging machine (cold forging test machine with load capacity of 6000 kN) was used. Further, top dies of carbide (material: RF06) having three types of arc cross-sections of radii of curvature of 5.1 mm, 4.0 mm, and 3.0 mm and ring-shaped projecting parts were used and flat plate bottom dies were used. Further, the amounts of indentation were changed to form rolling grooves in the race materials (SA materials and QT materials) to obtain races.

After forming the rolling grooves in the race materials, the shapes etc. of the rolling grooves were measured. The shape measurement generally can be performed by an optical type, laser type, or contact probe type shape measuring device under conditions of a measurement width of 8 mm or more, a height resolution of 1 μm or more, and a horizontal resolution of 5 μm or more. In this measurement, a Keyence shape measuring device (VK-X150) was used to measure the shapes of the rolling grooves and depths of the rolling grooves. The results are shown in Table 2.

TABLE 2

| Sample no. | Radius of curvature of projecting part of top die | Material of race | Depth of groove (mm) | Radius of curvature of groove bottom (mm) |
|---|---|---|---|---|
| 1 | 5.1 | SA material | 0.10 | 9.30 |
| 2 | 5.1 | SA material | 0.29 | 5.98 |
| 3 | 5.1 | SA material | 0.58 | 5.10 |
| 4 | 5.1 | SA material | 0.86 | 4.94 |
| 5 | 5.1 | QT material | 0.02 | 14.94 |
| 6 | 5.1 | QT material | 0.12 | 8.04 |
| 7 | 5.1 | QT material | 0.19 | 7.34 |
| 8 | 4.0 | QT material | 0.02 | 10.77 |
| 9 | 4.0 | QT material | 0.14 | 5.48 |
| 10 | 4.0 | QT material | 0.21 | 5.12 |
| 11 | 3.0 | QT material | 0.02 | 7.77 |
| 12 | 3.0 | QT material | 0.16 | 3.86 |
| 13 | 3.0 | QT material | 0.25 | 3.69 |

Figure 13:
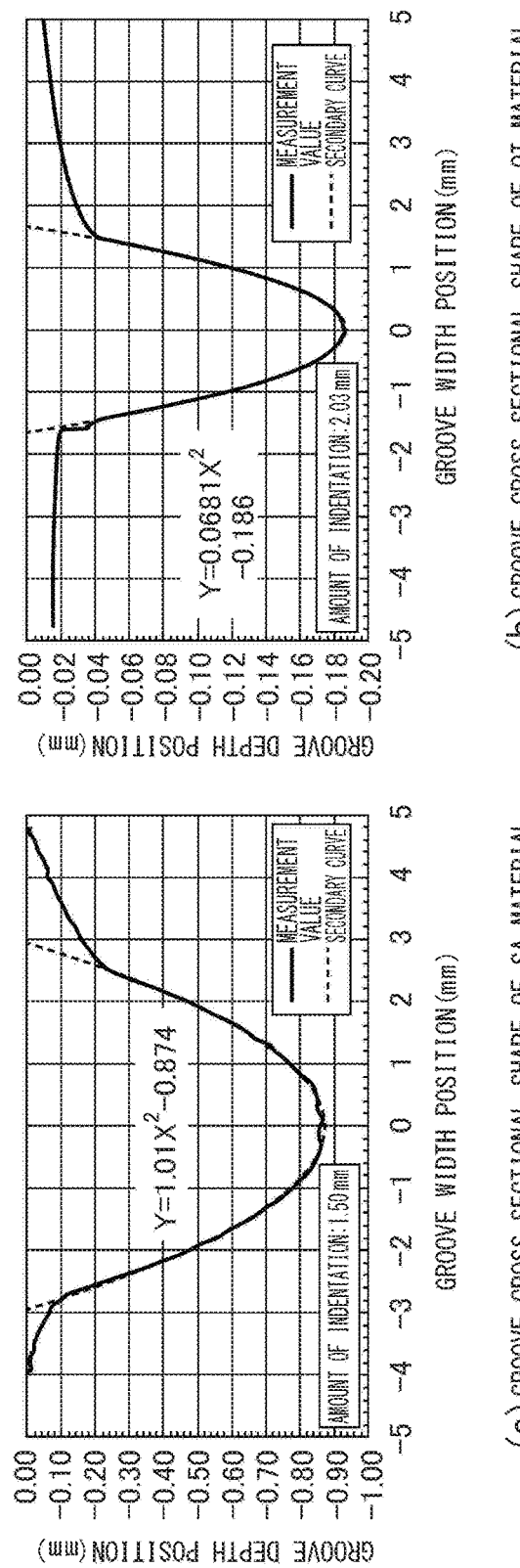

The races of Sample Nos. 1 to 13 shown in Table 2 were investigated for the shapes of the grooves when viewed by a cross-section. It was learned that each could be approximated by a secondary function. As typical examples, the cross-sectional shapes of the grooves of the races of Sample No. 4 and Sample No. 13 are shown in FIGS. 13A and 13B.

Figure 14:
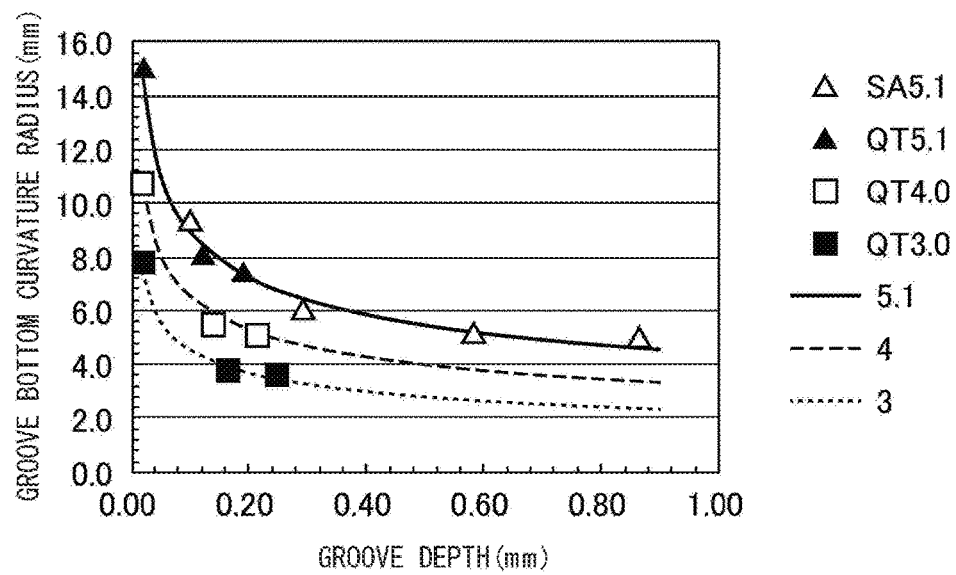
FIG. 14 is a graph showing the relationship between a radius of curvature of a groove bottom and a groove depth when changing the radius of curvature of a projecting part of a top die for each of the SA material and QT material.

Furthermore, FIG. 14 is a graph showing the relationship between the radius of curvature of the bottom of the groove and the groove depth. Note that, the notations outside the box of FIG. 14 (for example, SA5.1) show the grades of the race materials and the curvatures of the top die (mm).

From the results of FIG. 14, even if the material of the races and in turn the deformation resistance differ, it is proved that the radius of curvature R' of the bottom of the groove can be expressed by equation (19) using the radius of curvature "r" of the projecting part of the top die and groove depth "d":

$$R' = 0.550 r^{1.28} d^{-0.307} \quad (19)$$

Due to the above, it was proved that regardless of the material of the race, if pushing a top die with an arc shaped cross section into the race material on a flat plate, the cross-sectional shape of the recessed part exhibits a profile shape of a secondary curve in each case and the radius of curvature of the groove bottom and the groove depth can be expressed by a single function.

Example Relating to Effect in Case of Forming Recessed Part Race in Two Stages

Figure 15:
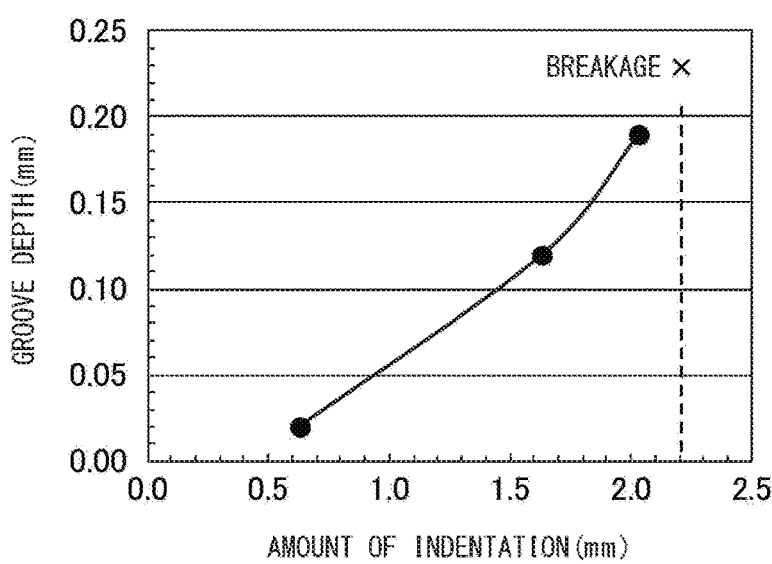
FIG. 15 is a graph showing the relationship between a groove depth and an amount of indentation when making a radius of curvature "r" of the projecting part of the top die 5.1 mm and cold forging the QT material, where the x marks indicate amounts of indentation at the time of break.

Next, the relationship between the groove depth and the amount of indentation in the case in the "Example Relating to Relationship of Groove Depth and Radius of Curvature of Groove Bottom" where the radius of curvature "r" of the projecting part of the top die is made 5.1 mm and cold forging a QT material is shown in FIG. 15. According to FIG. 15, it is judged that the material breaks when the amount of indentation is 2.3 mm.

Figure 16:
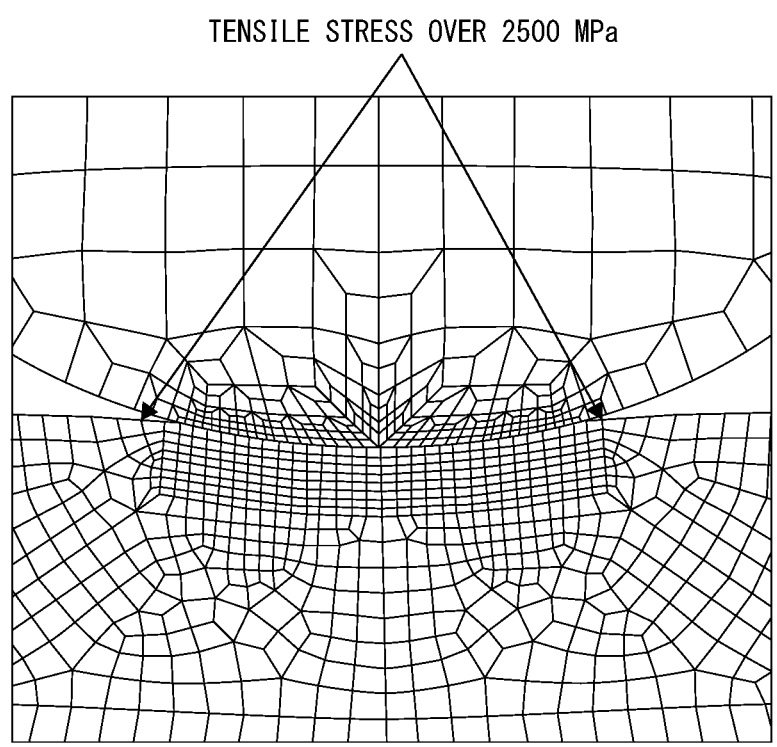
FIG. 16 is a view showing the results when performing FEM stress analysis on the race shown in FIG. 15.

FIG. 16 is a view showing the results at the time of FEM stress analysis of a race shown in FIG. 15. From the results of analysis shown in FIG. 16, an over 2500 MPa tensile stress is generated at the contact ends of the race and projecting part of the top die. It is believed that the race broke due to this stress. From the results of FIG. 15, if making the radius of curvature of the projecting part of the top die smaller, the generated tensile stress becomes smaller, but for safety's sake, the maximum groove depth formed in the race material comprised of a QT material is preferably 0.2 mm or less.

For this reason, for example, when desiring to make the groove depth of the recessed part a final 0.6 mm, it is preferable to first cold forge a race material not treated by QT to form a recessed part of a groove depth of a depth of 0.4 mm or so, then treat it by QT, then again cold forge it to further form a recessed part of a groove depth of 0.2 mm or so.

Due to the above, among the methods of production of a ball bearing of the present invention, the method of production of a race by multiple stages is advantageous on the point that by forming in advance a recessed part of a certain extent of groove depth in a relatively soft material, then treating it by QT, then cold forging it, even if a hard race, it is possible to precisely form a race having a desired cross-sectional profile line and in turn possible to prolong the lifespan of the ball bearing.

REFERENCE SIGNS LIST 10. radial ball bearing
12. inner race
14. outer race
14a. cross-sectional profile line of path
16, 26, 32. rolling balls
20. thrust ball bearing
22. upper race
24. lower race
34, 36. races
D. groove depth
D1, D3. first direction
D2, D4. second direction
L. distance from groove bottom
P1, P2. points
W. ½ groove width

The invention claimed is:

1. A method of production of a pair of races for use in a ball bearing provided with the pair of races at least one rolling element being movably clamped between said pair of races, characterized in that said method of production of a ball bearing comprises a cold forging process of cold forging an arc shaped die with a radius of curvature "r" having a cross-sectional shape of a contact surface satisfying equation (2) into a race material so as to form a recessed part having a profile line satisfying equation (3):

$$(R \times d^{0.307}/0.550)^{1/1.28} \times (1-0.05) \leq r \leq (R \times d^{0.307}/0.550)^{1/1.28} \times (1+0.05) \quad (2)$$

$$X^2/\{2R(1+0.05)\} < Y < X^2/\{2R(1-0.05)\} \quad (3)$$

where
a radius of said rolling element is R,
in a cross-sectional view of the pair of races, an axis extending in a first direction over which said pair of races face is the Y-axis and an axis extending in a second direction perpendicular to said first direction is the X-axis, and a depth of a recessed part formed in said races in said first direction is "d".

2. The method of production of a pair of races for use in a ball bearing according to claim 1, comprising
using said cold forging process to work said race material and form an pre-finish product having a difference (d−a) of said depth "d" and "a" satisfying equation (5) as a depth of the recessed part in said first direction,
then successively performing
a heat treatment process of quenching and tempering said pre-finish product and
said cold forging process of cold forging said arc shaped die having a cross-sectional profile satisfying equation (2) into the heat treated pre-finish product:

$$0.1 \text{ mm} \leq a \leq 0.2 \text{ mm} \tag{5}.$$

3. A method of production of a pair of races for use in a ball bearing provided with the pair of races at least one rolling element being movably clamped between said pair of races, characterized in that said method of production of a ball bearing comprises:
a machining process of machining the race material so as to form a recessed part of a depth "d" having a profile line satisfying equation (4),
where
a radius of said rolling element is R and,
in a cross-sectional view of the pair of races, an axis extending in a first direction over which said pair of races face is the Y-axis and an axis extending in a second direction perpendicular to said first direction is the X-axis,
said machining process resulting in working said race material so as to form an pre-finish product having a difference (d−a) of said depth "d" and "a" satisfying equation (5) as a depth of the recessed part in said first direction,
then successively performing
a heat treatment process of quenching and tempering the pre-finish product, and
a cold forging process of cold forging an arc shaped die having a cross-sectional profile satisfying equation (2) into the heat treated pre-finish product $$(R \times d^{0.307}/0.550)^{1/1.28} \times (1-0.05) \leq r \leq (R \times d^{0.307}/0.550)^{1/1.28} \times (1+0.05) \tag{2}$$

$$X^2/\{2R(1+0.05)\} < Y < X^2/\{2R(1-0.05)\} \tag{4}$$

$$0.1 \text{ mm} \leq a \leq 0.2 \text{ mm} \tag{5}$$

4. The method of production of a ball bearing according to claim 3, comprising
using said cold forging process or said machining process to work said race material and form an pre-finish product having a difference (d−a) of said depth "d" and "a" satisfying equation (5) as a depth of the recessed part in said first direction,
then successively performing
a heat treatment process of quenching and tempering said pre-finish product and
a cold forging process of cold forging an arc shaped die with a radius of curvature "r" having a cross-sectional shape of a contact surface satisfying equation (2) into a race material so as to form a recessed part having a profile line satisfying equation (3):

$$(R \times d^{0.307}/0.550)^{1/1.28} \times (1-0.05) \leq r \leq (R \times d^{0.307}/0.550)^{1/1.28} \times (1+0.05) \tag{2}$$

$$X^2/\{2R(1+0.05)\} < Y < X^2/\{2R(1-0.05)\} \tag{3}$$

where
a radius of said rolling element is R,
in a cross-sectional view of said ball bearing, an axis extending in a first direction over which said pair of races face is the Y-axis and an axis extending in a second direction perpendicular to said first direction is the X-axis, and
a depth of a recessed part formed in said races in said first direction is "d", into the heat treated pre-finish product:

$$0.1 \text{ mm} \leq a \leq 0.2 \text{ mm} \tag{5}.$$

5. A method of production of a ball bearing provided with a pair of races for use in a ball bearing according to one of claims 1 to 2 and at least one rolling element movably clamped between said pair of races.

* * * * *